US005729367A

United States Patent [19]
Smith

[11] Patent Number: 5,729,367
[45] Date of Patent: Mar. 17, 1998

[54] MULTIPLE-IMAGE MULTIPLEXED HOLOGRAPHIC DISPLAY

[75] Inventor: Ronald T. Smith, Corona Del Mar, Calif.

[73] Assignee: Hughes Electronics, Los Angeles, Calif.

[21] Appl. No.: 725,111

[22] Filed: Oct. 2, 1996

[51] Int. Cl.⁶ .................... G03H 1/24; G03H 1/28
[52] U.S. Cl. .................... 359/24; 359/32; 359/34
[58] Field of Search .................... 359/22, 24, 32, 359/33, 34, 1; 345/4, 7

[56] References Cited

U.S. PATENT DOCUMENTS

| | | | |
|---|---|---|---|
| 4,543,515 | 9/1985 | Upatnieks | 359/32 |
| 4,790,613 | 12/1988 | Moss | 359/32 |
| 4,795,223 | 1/1989 | Moss | 359/24 |
| 4,889,780 | 12/1989 | Cosner | 359/32 |
| 5,101,193 | 3/1992 | Smith et al. | 359/1 |
| 5,121,229 | 6/1992 | Benton et al. | 359/1 |
| 5,214,425 | 5/1993 | Wreede | 359/24 |
| 5,515,184 | 5/1996 | Caulfield et al. | 359/34 |

*Primary Examiner*—Jon W. Henry
*Attorney, Agent, or Firm*—Leonard A. Alkov; Wanda K. Denson-Low

[57] ABSTRACT

A multiple image multiplexed holographic display including a light pipe (11, 111) having first and second opposing surfaces (11a, 11b, 111a, 111b) and a plurality of input surfaces (15, 115) located between adjacent edges of the first and second opposing surfaces. A multiple image hologram structure (13, 113) attached to one of the first and second opposing surfaces is illuminated with respective beams injected into the light pipe by a plurality of light sources (17, 50, 61) adjacent respective input surfaces. The injected beams are incident on the hologram structure at different incidence angles, and the hologram structure contains holographic images that are recorded to reconstruct in response to respective injected beams, whereby each holographic image is selectively displayed by controlling its associated light source.

4 Claims, 2 Drawing Sheets

MULTIPLE-IMAGE MULTIPLEXED HOLOGRAPHIC DISPLAY

BACKGROUND OF THE INVENTION

The disclosed invention relates generally to display systems, and more particularly to a multiple image multiplexed holographic display wherein multiple images can be individually or simultaneously displayed in the same display region.

Current automotive radio console and instrument panel displays strive to display information with thin, simple, inexpensive and compact display systems that achieve reasonable image brightness, brightness uniformity and color uniformity. Consistently with this purpose, automotive displays make use of various optical techniques including light piping, lens focusing, diffusion, and color filtering. However, current automotive display technology does not provide for overlapping of images, which requires individual images to be displayed in separate areas.

SUMMARY OF THE INVENTION

It would therefore be an advantage to provide a compact and economical display that is capable of displaying different images in a single display area.

Another advantage would be to provide a compact and economical display that is capable of simultaneously displaying different images in a single display area.

A further advantage would be to provide a display that is capable of displaying different images in a multiplexed manner in a single display area.

The foregoing and other advantages are provided by the invention in a holographic display that includes a light pipe having first and second opposing surfaces and a plurality of input surfaces; a plurality of light sources respectively adjacent the plurality of input surfaces for providing respective input beams to respective input surfaces, such that respective injected beams propagate within the light pipe; and a multiple image hologram structure attached in an index matching manner to one of the opposing surfaces of the light pipe, the multiple image hologram structure having a plurality of holographic images recorded therein for respective reconstruction by the respective injected beams.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
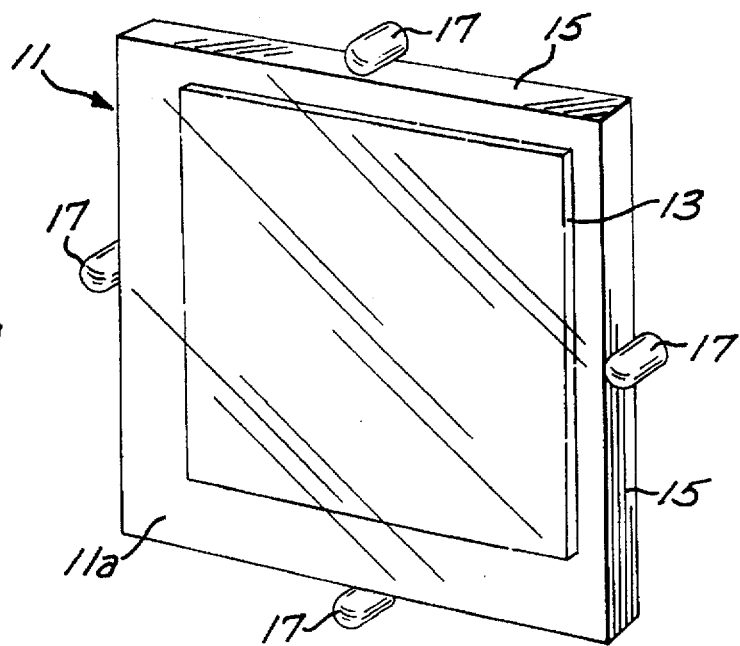
FIG. 1 sets forth a schematic perspective view of a multiplexed multiple image holographic display in accordance with the invention.

In the following detailed description and in the several figures of the drawing, like elements are identified with like reference numerals.

Figure 2:
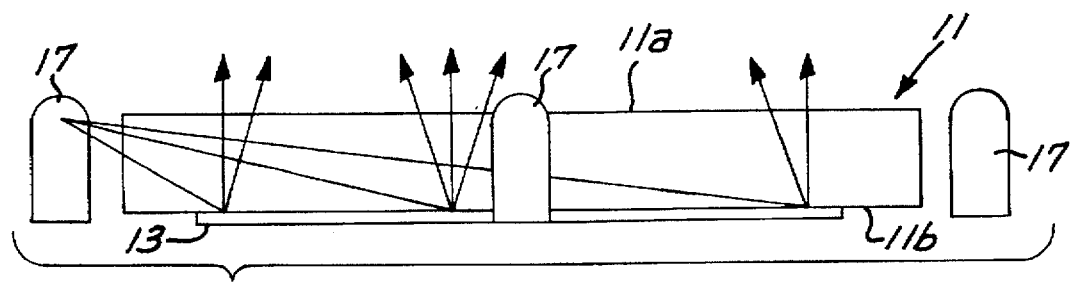
FIG. 2 sets forth a schematic side elevational view of the multiplexed multiple image holographic display of FIG. 1.

Referring now to FIGS. 1 and 2, set forth therein are a schematic perspective view and a side elevational view of a holographic display in accordance with the invention which includes a thin, flat, substantially transparent light pipe 11 having a first planar surface 11a and a second planar surface 11b that is opposite and parallel to the first planar surface 11a. The first planar surface 11a can be considered a front surface of the light pipe 11, while the second planar surface 11b can be considered a rear surface of the light pipe 11. The first and second planar surfaces 11a, 11b comprise identically shaped polygons, and a plurality of narrow input surfaces 15 extend between adjacent edges of the first planar surface 11a and the second planar surface 11b.

A multiple image reflection hologram structure 13 is laminarly attached in an index matching manner to the second planar surface 11b. The multiple image hologram 13 contains a plurality of image holograms that are constructed for respective reconstruction by respective injected beams provided by a plurality of incandescent bulbs 17 located adjacent respective narrow input surfaces 15 of the light pipe 11. For the particular implementation of the multiple image hologram structure 13 as a reflection hologram structure, the reconstructed images are viewable on the side of the first surface 11a. To the extent that the multiple image hologram structure is implemented as a transmission hologram, the reconstructed images would be viewable on the side of the second surface 11b.

By way of illustrative example, the multiple image hologram structure 13 is comprised of a stack of hologram layers, each layer containing a single holographic image, or a single hologram layer containing a plurality of holographic images.

The number of incandescent bulbs 17 corresponds to the number of different holographic images contained in the multiple image hologram 13, and the number of narrow input surfaces 15 is at least equal to the number of such different holographic images. Each incandescent bulb 17 is configured to direct a beam to the adjacent input surface 15, at an angle such that the portion of the beam that is injected into the light pipe propagates toward the multiple image hologram structure 13. Thus, each of the incandescent bulbs 17 produces an injected beam that is incident at the multiple image hologram structure 13 at angle that is different from the incident angles of the other injected beams, wherein incidence angle is comprised of (1) the angle of the injected beam relative to normal and (2) the azimuthal angle of rotation about the hologram surface normal. In other words, the injected beams have different directions. By way of illustrative example, each incandescent bulb includes a suitable reflector for directing light to the adjacent input surface 15.

Since the injected beams are at different incidence angles, and since each of the holographic images contained in the multiple image hologram structure 13 are configured to reconstruct only in response to a predetermined one of the injected beams, display of each of the images in the multiple hologram structure 13 is achieved by energizing the associated incandescent lamp. In this manner, each of the holographic images is individually controlled for display.

Figure 3:
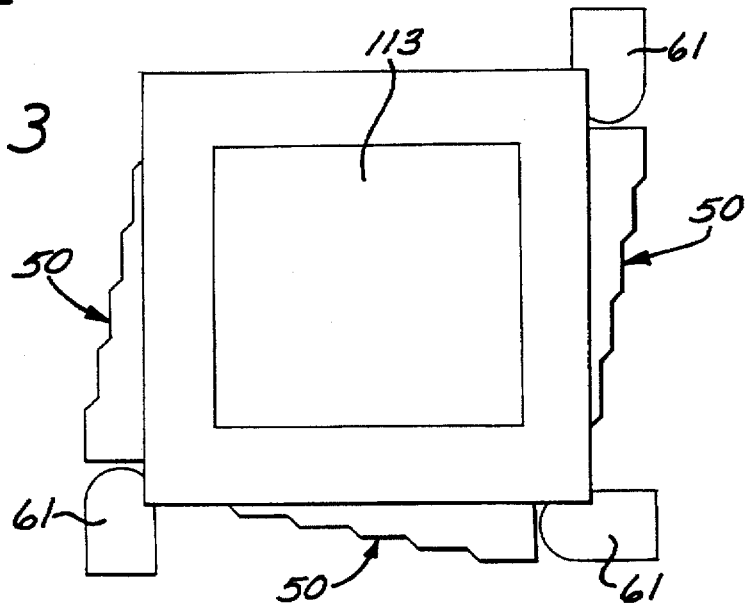
FIG. 3 sets forth a schematic front elevational view of a further multiple image multiplexed holographic display in accordance with the invention.
Figure 4:
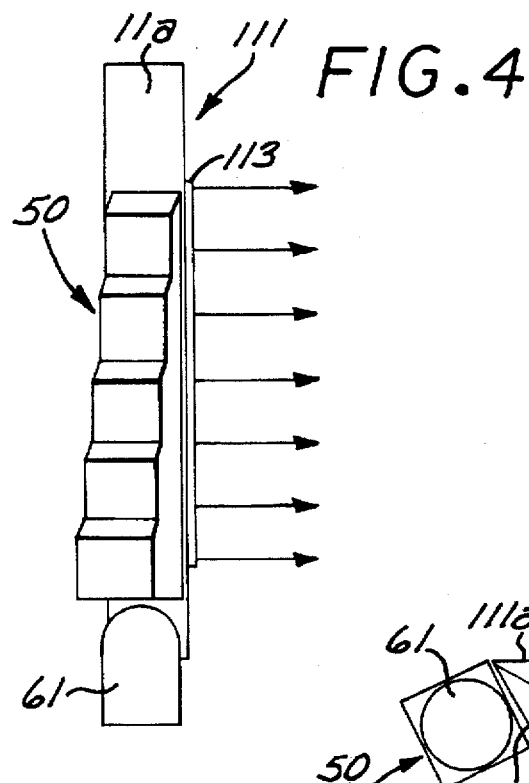
FIG. 4 sets forth a schematic side elevational view of the multiple image multiplexed holographic display of FIG. 3.
Figure 5:
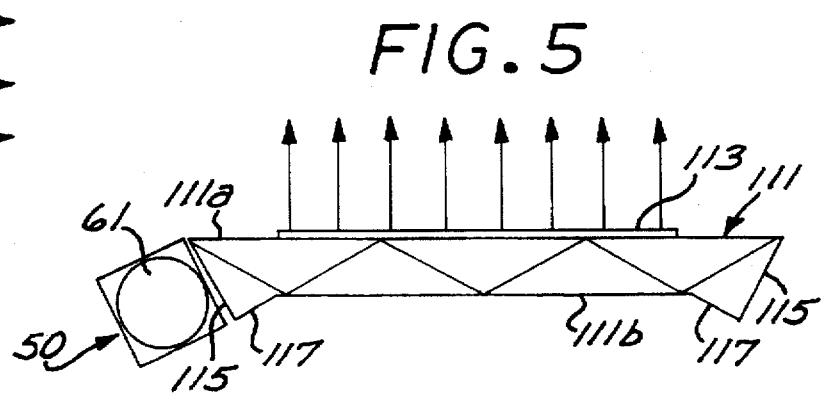
FIG. 5 sets forth a schematic cross sectional view of the multiple image multiplexed holographic display of FIG. 3.

Referring now to FIGS. 3, 4 and 5, schematically set forth therein are a front elevational view, side elevational view and cross sectional view of a further multiplexed holographic display in accordance with the invention. The display includes a generally flat light pipe 111 that includes a front or first surface 111a and a rear or second surface 111b that is opposite and substantially parallel to the first surface 111a. The first surface 111a and the second surface 111b are similarly shaped polygons, wherein the first surface 111a is larger than the second surface 111b. Angled faces 117 extend outwardly and forwardly from the periphery of the second surface 111b such that the outer edges of the angled faces 117 form a polygon that is similar to the polygon shape of the first surface 111a and the second surface 111b, and input surfaces 115 extend between the edges of the first surface 111a and the outer edges of the angled faces 117.

A multiple image transmission hologram structure 113 is laminarly attached in an index matching manner to the first planar surface 111a. The multiple image hologram 113 contains a plurality of image holograms that are constructed for respective reconstruction by respective injected beams provided by a plurality of optical couplers 50 located adjacent respective input surfaces 115 of the light pipe 111. For the particular implementation of the multiple image hologram structure 113 as a transmission hologram structure, the reconstructed images are viewable on the side of the first surface 111a. To the extent that the multiple image hologram structure 113 is implemented as a reflection hologram, the reconstructed images would be viewable on the side of the second surface 111b.

By way of illustrative example, the multiple image hologram structure 113 is comprised of a stack of hologram layers, each layer containing a single holographic image, or a single hologram layer containing a plurality of holographic images.

The number of optical couplers 50 corresponds to the number of different holographic images contained in the multiple image hologram 113, and the number of input surfaces 115 is at least equal to the number of such different holographic images.

Each beam provided by an optical coupler 50 and the angle of the input surface 115 on which such beam is incident are configured such that the injected beam propagates within the light pipe 111 pursuant to total internal reflection.

In this manner, each optical coupler 50 produces an injected beam that is incident at the multiple image hologram structure 113 at angle that is different from the incident angles of the other injected beams, wherein incidence angle is comprised of (1) the angle of the injected beam relative to normal and (2) the azimuthal angle of rotation about the hologram surface normal. In other words, the injected beams have different directions.

Since the injected beams are at different incidence angles at the multiple image hologram structure 113, and since each of the holographic images contained in the multiple image hologram structure 113 are configured to reconstruct only in response to a predetermined one of the injected beams, display of each of the images in the multiple hologram structure 113 is achieved by energizing the associated incandescent lamp. In this manner, each of the holographic images is individually controlled for display.

For the particular implementation wherein input surfaces 115 on opposite sides of the light pipe 111 are at the same angle relative to the second surface 111b and are mutually orthogonal to a plane that is orthogonal to the second surface 111b, each optical coupler 50 is configured to direct light from an associated light emitting diode (LED) lamp 61 to the adjacent input surface 115, at an angle such that the portion of the beam that is injected into the light pipe emerges from the input surface 115 at a non-normal angle. In other words, the light from an optical coupler 50 is incident on an adjacent input surface 115 at a non-normal angle. The injected beam needs to be non-normal relative to the input surface 115 from which it emerges in order to prevent reflection at an input surface on the other side of the light pipe 111 that could cause reflective reconstruction of the hologram image configured to be responsive to such injected beam.

Figure 6:
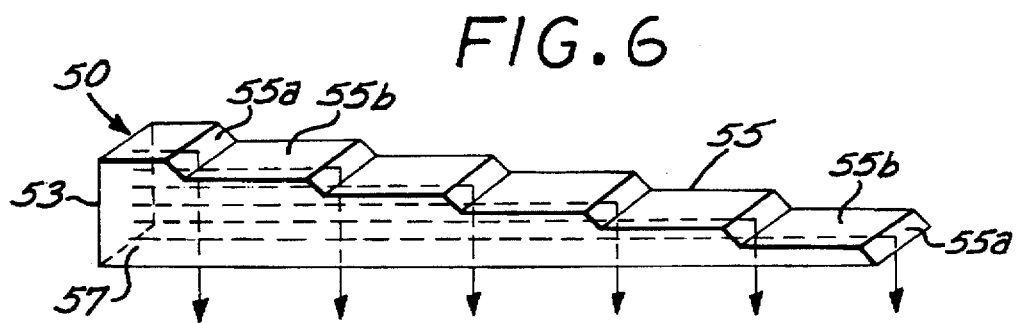
FIG. 6 sets forth a schematic perspective view of a tapered optical coupler of the multiple image multiplexed holographic display of FIGS. 3, 4 and 5.
Figure 7:
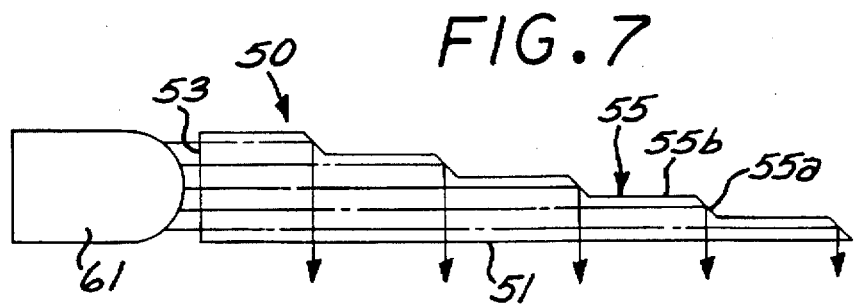
FIG. 7 sets forth a schematic plan view of a tapered optical coupler of FIG. 6.

As more particularly shown in FIGS. 6 and 7, each tapered optical coupler 50 comprises a generally elongated substantially transparent substrate having an elongated planar output surface 51, an input side 53 for coupling light from an LED lamp 61 into the optical coupler 50, and an internally reflecting side 55 opposite the output surface 51 for reflecting toward the output surface 51 a portion of the light injected into the coupler 50 at the input side 53. The optical coupler 50 further includes opposing parallel sides 57 that extend from the longitudinal edges of the output surface 51 to the internally reflecting side 55. For example, the opposing parallel sides 57 are orthogonal to the output surface 51.

The reflective side 55 of the optical coupler 50 more particularly includes a plurality of parallel internally reflecting surfaces 55a which are orthogonal to a plane that is parallel to the longitudinal extent of the planar output surface 51 and orthogonal to the planar output surface 51, and are angularly disposed to generally face the input side 53 and the output surface 51 so as to reflect toward the output surface 51 light that is injected into the optical coupler 50 by the light emitting diode 61. The parallel internally reflecting surfaces 55a are spaced apart along the longitudinal extent of the output surface 51, and are at stepwise progressively closer distances to the output surface 51 with increasing distance from the input side 53. The internally reflecting surfaces 55a are separated by separation surfaces 55b that are parallel to the output surface 51, whereby the internally reflecting surfaces 55a are adjoining when viewed along the longitudinal extent of the output surface 51.

Effectively, the reflective side 55 of the optical coupler 50 comprises a stepped surface having (a) a series of internally reflecting surfaces 55a that are located at positions that are stepwise closer to the output surface 51 with distance from the input side 53, and (b) a series of separation surfaces 55b that are parallel to the output surface 51 and interconnect adjacent edges of adjacent internally reflecting surfaces 55a.

By way of illustrative example, the LED lamp 61 and the input side 53 are configured so that the optical axis of the injected light in the optical coupler is parallel to the longitudinal extent of the output surface 51, and the internally reflecting surfaces 55a are about a 45 degree angle relative to the output surface 51.

As shown in FIG. 5, the output surface 51 of each light coupler 50 is separated by a gap from the adjacent input surface 115 of the light pipe 111 so that injected light in the optical coupler 50 is trapped by total internal reflection within the light coupler 50 until portions of the injected light are reflected toward the output surface 51 by the internally reflecting surfaces 55a. The internally reflecting surfaces 55a preferably span the extent of the input side 53, such that almost all of the injected light is reflected to the output surface 51. The light reflected by the internally reflecting surfaces 55a is preferably incident at the output surface 51 at close to normal, and thus almost all of the injected light reflected by the internally reflecting surfaces 55a is efficiently transmitted by the output surface 51.

The foregoing has thus been a disclosure of a multiple image multiplexed holographic display wherein different images can be displayed individually or simultaneously in a single display area by selectively energizing light sources respectively associated with the different holographic images. The display advantageously utilizes the angular selectively of holograms to control the display of the respective images, and to efficiently deliver light into well defined viewing regions.

Although the foregoing has been a description and illustration of specific embodiments of the invention, various modifications and changes thereto can be made by persons skilled in the art without departing from the scope and spirit of the invention as defined by the following claims.

What is claimed is:

1. A holographic display comprising:

a light pipe having first and second opposing surfaces and a plurality of input surfaces;

a plurality of light sources respectively adjacent said plurality of input surfaces for providing respective input beams to respective input surfaces, such that respective injected beams propagate within said light pipe; and a multiple image hologram structure attached in an index matching manner to said first side of said light pipe, said multiple image hologram structure having a plurality of holographic images recorded therein for respective reconstruction by said respective injected beams.

2. The holographic display of claim 1 wherein each of said plurality of light sources comprises an incandescent bulb.

3. The holographic display of claim 1 wherein each of said plurality of light sources comprises a light emitting diode and an optical coupler for illuminating a respective input surface with light from said light emitting diode.

4. The holographic display of claim 1 wherein said injected beams propagate within said light pipe pursuant to total internal reflection.

* * * * *